Jan. 29, 1924.
E. P. HEWITT
1,482,233
COMBINED SAFETY AND SHUT-OFF VALVE
Filed March 31, 1921   2 Sheets-Sheet 1
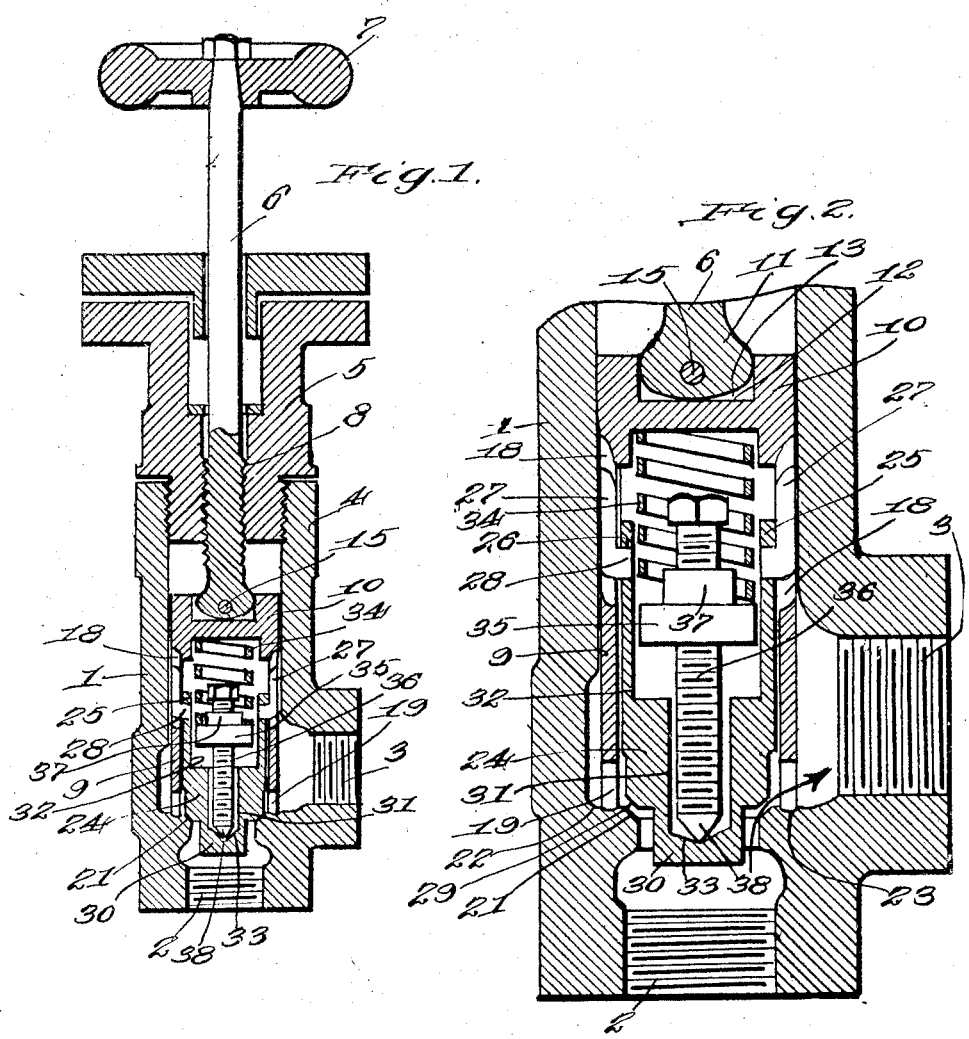

Jan. 29, 1924.
E. P. HEWITT
1,482,233
COMBINED SAFETY AND SHUT-OFF VALVE
Filed March 31, 1921
2 Sheets-Sheet 2
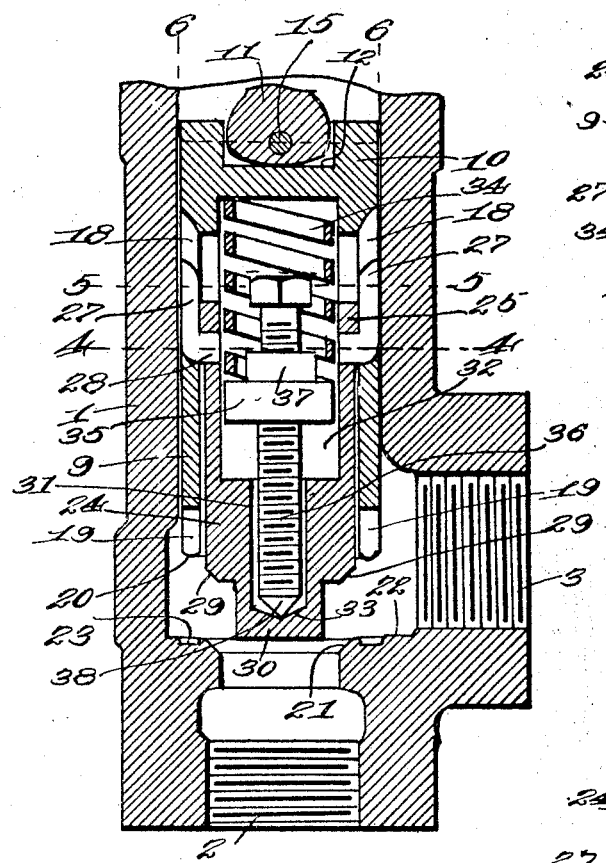
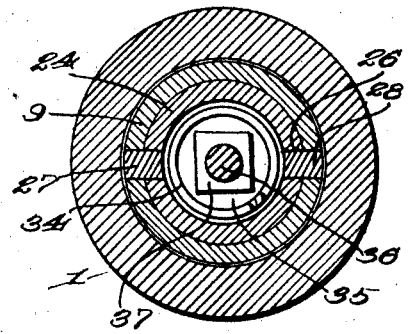
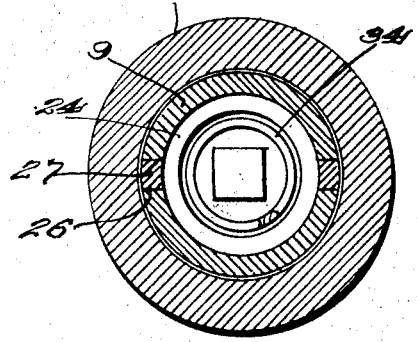
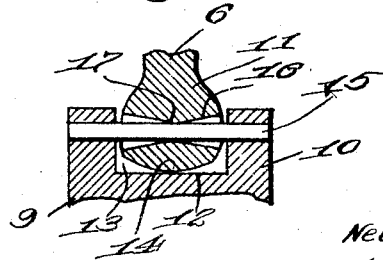
Inventor
Edwin P. Hewitt
Deceased
Nellie Hewitt
Administratrix
by Carl N. Crawford
Attorney Patented Jan. 29, 1924.

1,482,233

UNITED STATES PATENT OFFICE.

EDWIN P. HEWITT, OF SPOKANE, WASHINGTON; NELLIE HEWITT ADMINISTRATRIX OF SAID EDWIN P. HEWITT, DECEASED.

COMBINED SAFETY AND SHUT-OFF VALVE.

Application filed March 31, 1921. Serial No. 457,826.

*To all whom it may concern:*

Be it known that I, EDWIN P. HEWITT, a citizen of the United States, residing at Spokane, in the county of Spokane and State of Washington, have invented new and useful Improvements in Combined Safety and Shut-Off Valves, of which the following is a specification.

This invention relates to improvements in safety valves of the globe type.

One of the objects of the invention is to provide a safety valve which is also equally adapted for us as a shut-off valve.

My improved valve includes a valve closure adapted for engagement with a valve seat, an actuator being yieldingly connected with the closure and serving to seat the latter with a predetermined maximum pressure, the closure being openable under any pressure thereagainst in excess of such maximum pressure.

A further object is to provide a safety valve in which the actuator is capable of being operated or turned to vary the pressure at which the closure may be unseated, this operation being capable of being performed exteriorly of the valve, and wholly independently of the fixed adjustment internally of the valve.

A further object is to provide the seat of the valve body with a surrounding area adapted to receive a sleeve like actuator in edge wise engagement therewith, the surrounding sleeve actuator being provided with one or more openings through which the fluid pressure may escape when the closure is unseated.

My invention also involves an improved method or means of applying to the closure a seating thrust in such a manner as always to cause the closure to accurately engage its seat, and in the most improved embodiment, I impose a fulcrum or pivotal thrust on the closure at a point beyond and below that portion of the closure which engages the valve seat. In accordance with my improved valve construction, the closure is movably mounted in such a manner that its closure portion will have a sufficient though relatively limited degree of freedom of play so that the closing thrust will be permitted a full and effective freedom of action.

A further novel feature resides in an improved means for nonrotatively and longitudinally slidably connecting the valve closure with the actuator sleeve in such a manner that while the closure may be effectively operated by said sleeve, the said connection will not in any way impair the facility with which the fulcrum thrust seats the closure. Furthermore, this improved connecting means is disposed and arranged in such radial or peripheral relation with respect to the axial portions of the sleeve and closure that the latter will be unobstructed and free for the disposition of the yielding means being interposed between the actuator and the closure.

My invention has many other features and objects which will be more fully described in the accompanying drawings and which will be more particularly pointed out in and by the appended claims.

In the drawings:—

Figure 1 is a sectional view of one form of my improved valve showing the closure and sleeve seated.

Figure 2 is an enlarged sectional view showing how the pressure may unseat the closure and escape through the seated sleeve.

Figure 3 shows the closure and sleeve retracted from the valve seat.

Figure 4 is a sectional view on line 4—4 of Figure 3.

Figure 5 is a sectional view on line 5—5 of Figure 3.

Figure 6 is a sectional view on line 6—6 of Figure 3.

Figure 7 is an elevational view of the actuator sleeve.

Like characters of reference designate similar parts throughout the different figures of the drawings.

As illustrated, I have shown the device of my invention in the form of an angle valve, 1 being the valve body having a normal inlet 2 and discharge 3. Into the upper end 4, of the valve body 1, is threaded a stem guide and gland structure which I have generally indicated at 5, and which will not be described in detail for the reason that it does not form a part of my invention. A valve stem 6, having a hand wheel 7, extends through the structure 5 and has threaded connection therewith at 8.

An actuator, which is in the present construction shown in the form of a sleeve 9, telescopes the valve body 1 and is specifically in the form of an inverted cup, the bottom or base being indicated at 10. As shown more particularly in Figure 6, the lower end of the stem 6 has a head 11 which fulcrums on the bottom 12 of a recess 13 in the base 10. The head 11 is suitably rounded at 14, as clearly shown. A pin 15 extends through the base 10 and through an oppositely tapered bore 16 in the head 11, the oppositely tapered portions of the bore 16 converging at 17. Should the structure 5 slightly inaccurately align with the upper end 4 of the valve body 1, this free play connection of the actuator sleeve with the stem 8 would provide for turning the sleeve efficiently without causing the sleeve to bind in the valve body 1 in which the upper end of the sleeve 9, fits relatively snugly.

The sleeve 9 has oppositely disposed slots 18, opening through the wall thereof, as clearly shown in Figure 2. The lower end of the sleeve 9 has its edge interrupted to form a series of openings 19, through which the fluid pressure may escape in the direction of the arrows shown in Figure 2. These openings provide the lower edge of the sleeve 9 with a series of reduced edges 20, the function of which is to cause the sleeve to keep grinding a smooth and accurate reseating engagement with the valve body, as will presently appear.

The valve body 1 has a valve seat structure comprising a valve seat 21 at forty-five degrees angle to the axis of the valve, and surrounding said seat is an area 22 for engagement by the lower edge of the valve sleeve 9. If this area 22 were smooth and flat, the lower edge of the sleeve 9 would tend to shift itself out of line with its upper portion, thereby causing a binding action. Therefore, I initially provide the area 22 with a groove 23, in accurate concentric relation about the seat 21 so that when the sleeve 9 is advanced it will seat in said groove and the reduced edges 20 will regrind the groove clear from foreign matter every time the sleeve is seated and the latter will be held by the groove with the lower edge in accurately aligned relation with the upper end.

My improved closure is designated at 24 and the same is in the form of a cup which interiorly telescopes the inverted cup sleeve. Near the upper edge 25, of the closure, holes 26 are provided in such a manner as to register with the slots 18. The closure and sleeve members are non-rotatively and longitudinally slidably connected by means which take the form of angle couplers. The longer angular portions or limbs 27 are disposed in the slots 18 and are held in place by the closure end 25 and the interior wall of the valve body 1. When the parts are removed from the body 1, they may readily be separated. The shorter limbs 28, are bent at right angles to the limbs 27 and project into the holes 26. The slots 18 are of sufficient excess length with respect to the limbs 27 to provide for a suitable relative longitudinal play of the closure with respect to the sleeve. The lower ends of the slots 18 form abutment shoulders which limit advancing projection of the closure with respect to the sleeve, as clearly shown in Figure 3. It will be noted that the upper portion of the closure 24, snugly fits the interior of the sleeve 9 whereas the lower portion has a relatively considerable free play with respect thereto, the reason for which will presently appear. Between its ends, the closure 24 has a closure portion or seat 29 which is likewise at an angle of forty-five degrees to the axis of the closure and which is adapted to engage seat 21. The lower end of the closure is indicated at 30 and the same extends beyond the closure portion 29. The closure 24 has a bore 31 of somewhat reduced diameter with respect to the cupped portion 32 and the lower end of the bore tapers to a fulcrum center 33. This center 33, it will be noted, is below the closure portion 29.

Reference will next be made to the yielding means connecting the sleeve 9 with the closure 24, and which in the present construction, is interposed therebetween.

Said means includes an expansively acting spring 34, the upper end of which seats in the bottom of the cup shaped sleeve 9. A lower end of the spring rests upon an adjustable abutment 35 which fits the closure 24 with a slight clearance. This abutment is threaded upon a thrust bolt or spindle 36 and a lock nut 37 serves to hold the abutment in its adjusted position. Thus it will be seen that any desired tension may be imparted to the spring 34, change of such tension being impossible after the parts are inserted in the valve body 1. The lower end of thrust bolt 36 is tapered, as shown at 38 to fulcrum at 33, and said bolt fits the bore 31 with considerable clearance. It will now be clear that the action of the spring 34 will be to thrust the closure in advance of the sleeve 9 so that the closure will first engage seat 21 before the sleeve engages groove 23, the couplers limiting such advancing projection of the closure by engagement with the lower end of the slots 18.

It will now be clear that by reason of the fact that the couplers are peripherally disposed, the interior of the closure cup and sleeve is free not only for the interposition of the spring means but also the extension thereof to a point even below the closure portion 29. It will also be clear that by means of this disposition of the point of thrust at 33, which is below the closure portion 29, added to the fact that the seat 21 and closure portion 29 are inclined at angles of forty-five degrees to the axis of the closure, causes the closure to seek a true engagement. As the closure is turned into full pressure engagement with the seat, any foreign particles will not only be worn off but the cradle like thrust will always cause the closure to seek a true engagement and thereby form a tight joint.

One of the great advantages of my invention is that after the closure is fully seated with the maximum pressure, this pressure may be varied, or in other words and more specifically speaking, may be reduced by means exteriorly disposed with respect to the valve body. Thus by giving the hand wheel 7 a fraction or more turns backwardly, the sleeve 9 may be very slightly unseated thereby releasing tension on the spring 34 without unseating the closure 24. Therefore, if the valve were initially set so that in the closing position shown in Figure 1, the closure could not raise short of three hundred pounds pressure on its bottom face, a single turn might reduce this maximum pressure fifty or one hundred pounds, this being possible without altering the adjustment of abutment 35 on bolt 36.

It will also be clear that in addition to its function as a safety valve, the device of my invention can also effectively be used as a shut off valve, the full open position shown in Figure 3, illustrating this function.

It is believed that the advantages and utility of my invention will be fully understood from the foregoing description and while I have herein shown and described one specific form of my invention I do not wish to be limited thereto except for such limitations as the claims may import.

I claim:—

1. In a combined safety and shut-off valve, a valve body having a valve seat and a concentric groove surrounding said seat, a sleeve for engagement with said groove and having an interrupted edge for escape through said sleeve of fluid, a valve closure non-rotatably and longitudinally slidably mounted in said sleeve, a spring for projecting said closure toward said valve seat, and rotatable means for advancing said sleeve and closure toward or away from a closing position.

2. In a combined safety and shut-off valve, a valve body having a valve seat and an area surrounding said seat, a sleeve for engagement with said area and having an interrupted edge or portion for escape through said sleeve of pressure fluid, a valve closure non-rotatably and longitudinally slidably mounted in said sleeve, a spring for projecting said closure toward said valve seat, and means for advancing said sleeve and closure toward or away from a closing position.

3. In a combined safety and shut-off valve, a valve body having a valve seat and an area surrounding said seat, a sleeve for engagement with said area and having an opening for escape of pressure fluid through said sleeve, a valve closure in said sleeve, a spring acting to project said closure beyond the edge of said sleeve when the sleeve is spaced from said area, means for limiting projection of said closure, and means for seating said closure and sleeve consecutively.

4. In a safety valve, a valve body having a valve seat and an area surrounding said seat, a sleeve movable against said area and having an opening for escape of pressure fluid through said sleeve, a valve closure in said sleeve and having a closure portion for engagement with said valve seat, and means having pivotal engagement with said closure beyond said closure portion for seating said closure.

5. In a safety valve, a valve body having a valve seat and an area surrounding said seat, a sleeve movable against said area, a valve closure relatively loose in said sleeve as regards its closure end, said closure having a closure portion for engagement with said seat, and resilient means engaging said sleeve and having fulcrum or pivotal thrust engagement with said closure at a point beyond said closure portion, for seating said valve closure.

6. In a safety valve, a valve body having a valve seat and an area surrounding said seat, a sleeve movable against said area, a valve closure in said sleeve having its upper end fitting snugly in said sleeve and its lower end relatively loose in said sleeve, said closure having a closure portion adapted to engage said valve seat and being provided with a hollow extension projecting beyond said closure portion, a spring engaging said sleeve, a thrust bolt having fulcrum engagement with said closure beyond said closure portion and provided with an adjustable head for engagement by said spring whereby the tension of said spring may be altered.

7. In the sub-combination of the described safety valve, a valve body having a seat and an area surrounding said seat, a movable sleeve for engagement with said area, a valve closure in said sleeve having an end portion relatively free in said sleeve and provided with a closure portion adapted to engage said seat, and means engaging said closure beyond said closure portion for thrusting said closure toward said seat, whereby the point of thrust and the loose fit of said closure will permit the latter to wear itself true when rotatively moved into engagement with said seat.

8. In a safety valve, a valve body having a seat and an area surrounding said seat, a movable sleeve for engagement with said area and having passages in its wall for escape of fluid, a valve closure for engagement with said seat, spring means in and engaged by said sleeve set to maintain said closure at a predetermined distance in advance of said sleeve when the valve is open and with a predetermined maximum pressure after said sleeve has been seated, and means externally disposed with respect to said valve body and connected to said sleeve for moving said sleeve away from said area so as to diminish the maximum seating pressure of said closure.

9. In a safety valve, a valve body having a seat and an area surrounding said seat, a movable sleeve for engagement with said area and having passages in its wall for escape of fluid, a valve closure for engagement with said seat, spring means engaged by said sleeve and set to hold said closure on its seat with a predetermined maximum pressure after said sleeve has been seated, and means for rotating and retracting said sleeve to reduce the seating pressure of said closure from such maximum pressure without un-seating said closure.

10. In a safety valve, a valve body having a seat and an area surrounding said seat, a sleeve for engagement with said area and having an opening for escape of pressure fluid through said sleeve, a closure non-rotatively connected with said sleeve and adapted to engage said seat, spring means engaged by said sleeve and set to seat said closure with a predetermined maximum pressure after said sleeve has been seated, and means for rotatively retracting said sleeve from said area to reduce the seating pressure of said closure.

11. In a safety valve, a valve body having a valve seat and an area surrounding said seat, a closure for said seat, a sleeve in free clearance for edgewise engagement with said area, and said area having a groove to receive the edge of said sleeve to prevent the latter from shifting out of line when rotated against said area.

12. In a safety valve, a valve body having a valve seat and an area surrounding said seat, a closure for said seat, a sleeve for edgewise engagement with said area and such edge being interrupted for passage of pressure fluid through said sleeve, edge portions of said sleeve having reduced portions whereby said sleeve will grind clear a pathway into said area to prevent said sleeve from shifting out of line as it is turned against said area.

13. In a safety valve, a valve body having a valve seat, a sleeve for edgewise engagement with an area surrounding said seat at one end of said sleeve, the remaining end of said sleeve snugly telescoping said body and having coupling slots opening through the wall of said sleeve, a valve closure internally telescoping said sleeve and adapted to engage said valve seat and provided with holes registering with said slots, angle couplings having elongated portions slidable longitudinally in said slots and having portions projecting through said holes to longitudinally slidably and non-rotatably connect said sleeve and closure, and a spring interposed between said closure and sleeve and normally acting to project said closure in one direction in advance of said sleeve.

14. In a safety valve, a valve body having a valve seat and an area surrounding said seat, a sleeve for edgewise engagement with said seat area at one end of said sleeve and the remaining end of said sleeve telescoping the interior of said body and having coupling slots opening through the wall of said sleeve, a valve closure for said seat and having a portion internally telescoping said sleeve and provided with holes registering with said slots, couplings disposed in said slots and holes to connect said sleeve and closure and being held in position by the telescoping engagement of said sleeve, body and closure, said closure having a recess in its interior, and a spring in said closure engaging the latter and said sleeve and tending to project said closure toward said seat in advance of said sleeve.

15. In a safety valve, a valve body having a valve seat and a sleeve seating surface surrounding said seat, an inverted cup sleeve slidable in said valve body having an edge for engagement with said surface and said edge of said sleeve having an escape opening, a cup closure telescoping said sleeve and having a portion for engagement with said valve seat, and coupling means connecting the telescoping portions of said cup sleeve and cup closure.

16. In a safety valve, a valve body having a valve seat and a sleeve seating surface surrounding said seat, an inverted cup sleeve slidable in said valve body having an edge for engagement with said surface and said edge of said sleeve having an escape opening, a cup closure telescoping said sleeve and having a base portion for engagement with said valve seat, a spring device engaging the bases of said cup sleeve and cup closure to project the latter, means slidably connecting the telescoping portions of said sleeve and closure, and means for rotating and reciprocating said sleeve to seat the latter and said closure.

17. In a safety valve, a valve body having a valve seat and a surface surrounding said seat, a fluid pressure escape sleeve adapted to seat on said surface, a closure adapted to engage said seat, and means for positively advancing said sleeve toward said surface and yieldingly advancing said closure against said seat.

18. In a globe safety valve, a valve body having a valve seat structure, a closure and a fluid pressure escape sleeve for engagement with said seat structure, means connecting said closure with said sleeve and permitting relative longitudinal movement between the closure and sleeve, and a valve stem threaded in said body and loosely connected with said sleeve.

19. In a valve, a valve seat, a loosely held closure for engagement with said seat, and means having a fulcrum connection with and imposing closing thrust on said closure at a point beyond the area of contact of said closure with said seat.

20. In a valve, telescoping valve members, one member having a slot and the other member having an opening, and an angle coupling having one limb slidable in said slot and its other limb in said opening for coupling said members together.

21. In a valve, telescoping valve members, one member having a slot and the other member having a hole, and an angle coupling having a limb snugly fitting in said hole and another limb disposed in said slot and of reduced length with respect thereto, for slidably and non-rotatively connecting said members together.

22. In a safety valve, a valve casing having a valve seat structure, and telescoped fluid escape and safety valve members both movable against said seat structure and movable relative to each other.

23. In a safety valve, a valve casing having a valve seat structure, telescoped fluid escape and safety valve members both movable against said seat structure, and means for longitudinally slidably and non-rotatively connecting said members with each other.

24. In a safety valve, a valve casing having a valve seat structure, telescoped fluid escape and safety valve members both movable against said seat structure, means for longitudinally-slidably and non-rotatively connecting said members, a spring for actuating one of said members, and means for positively actuating the remaining member.

In testimony that I claim the foregoing as my own, I hereby affix my signature.

EDWIN P. HEWITT.